United States Patent

[11] 3,543,914

[72] Inventors Carmen S. Phillips
　　　　　　　Downers Grove, Illinois;
　　　　　　　James Corwith, Jr., Bettendorf, Iowa,
　　　　　　　Wilbur H. Clendenin, Ava, Illinois
[21] Appl. No. 775,400
[22] Filed Nov. 13, 1968
[45] Patented Dec. 1, 1970
[73] Assignee International Harvester Company,
　　　　　　　Chicago, Illinois
　　　　　　　a corporation of Delware

[54] FEED ROLLS
10 Claims, 7 Drawing Figs.
[52] U.S. Cl. .................................................. 198/167,
　　　　　　　　　　　　　　　　　　　　　　　198/127
[51] Int. Cl. .................................................. B65g 15/00
[50] Field of Search .......................................... 198/167,
　　　　　　　　　　127; 146/120, 118, 112; 56/1(C)

[56] References Cited
UNITED STATES PATENTS

| | | | |
|---|---|---|---|
| 2,857,946 | 10/1958 | Nikkel | 56/1(C)UX |
| 2,879,904 | 3/1959 | Walsh | 198/167 |
| 2,906,393 | 9/1959 | West | 198/167 |

Primary Examiner—Richard E. Aegerter
Attorney—Noel G. Artman

ABSTRACT: A feed assembly for a harvester having an enclosed drive train for differentially rotatable front and rear rollers, each having disposed thereon a plurality of peripheral serrate slats. Each of the rollers have a different number of slats wherein the teeth on the respective rollers interdigitate when their slats are alined in edge to edge relationship to function in combing relation to eliminate crop wrappings, and the teeth on successive slats on the rear roller being staggered relative to the teeth on the slats on the front roller so that the teeth on the rear roller work through laterally offset portions of a space between two corresponding teeth on the front roller.

Patented Dec. 1, 1970

3,543,914

Inventors
Carmen S. Phillips
James Corwith Jr.
Wilbur H. Clendenin
By John J. Kowach
Attorney

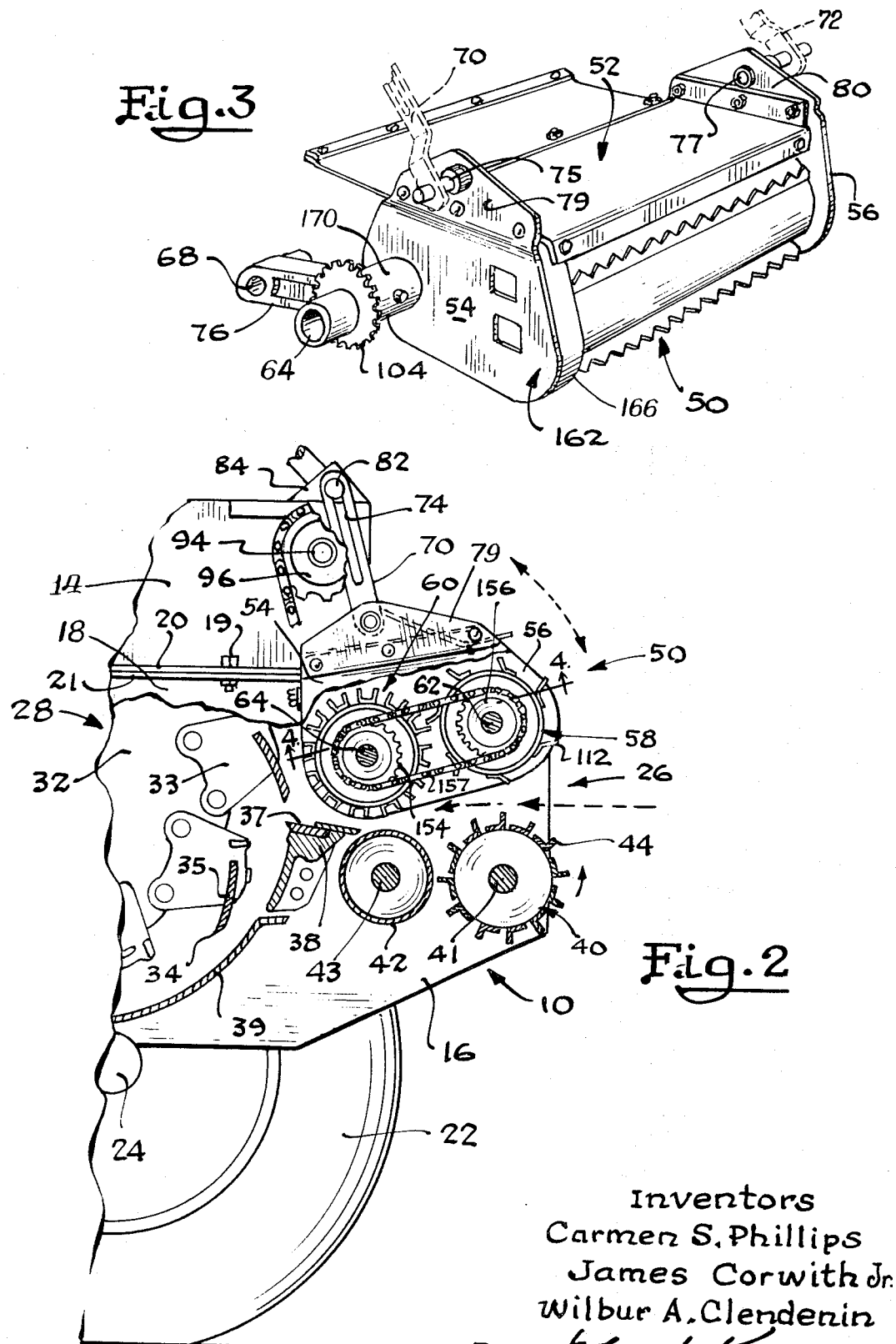

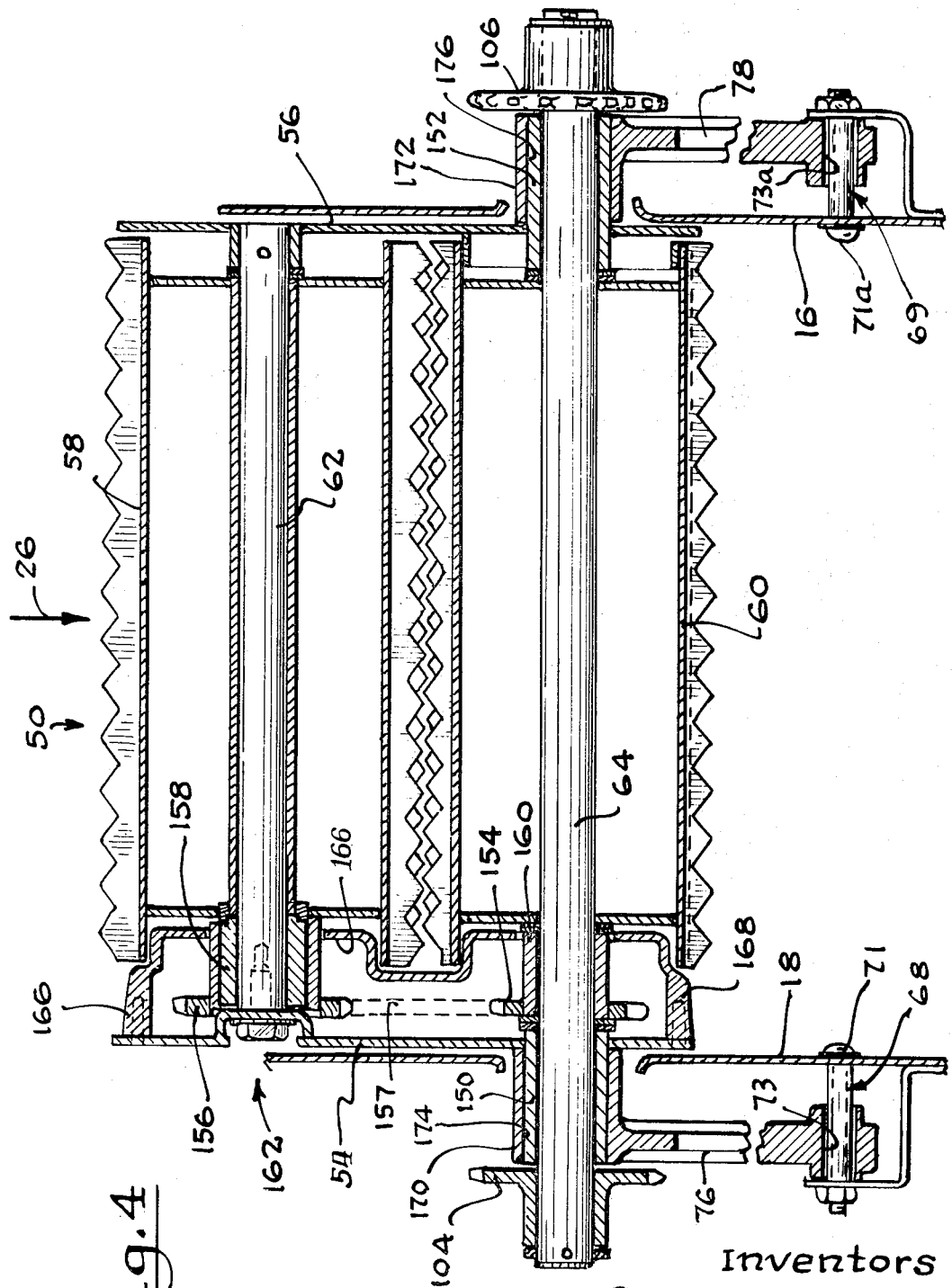

FEED ROLLS

BACKGROUND OF THE INVENTION

This invention relates to an improved conveying assembly for a forage harvester, and particularly relates to an upper pickup assembly with improved conveying means to convey elongated crop material.

Forage harvesters are widely known and used for harvesting elongated crop vegetation by means of a conveying assembly positioned at a forward part of a harvester vehicle which aggressively engages the elongated crop vegetation and feeds it to a chopper positioned next to the conveying assembly.

The conveying assembly of a forage harvester includes a lower feed assembly having fixed position rotatable rollers and an upper pivotable feed assembly which is raised by the volume of large bulk vegetation entering the conveying assembly, and which upper feed assembly is urged back towards the lower feed assembly following passage of such large bulk vegetation towards the chopper. The upper feed assembly is made pivotable usually by a linkage having one pivot on the frame of the harvester, and having another pivot coincidental with one of the roller shafts.

It is a desired goal to move the crop material between the upper and lower assemblies in an efficient manner without encountering substantial obstruction by the wrapping of the crop in the roller assembly, or the like. The rollers of the conveying assembly generally have slats extending radially from the peripheral surfaces of the rollers, and the edges of such slats are provided with teeth to grab and move the crop material toward the chopper assembly behind the conveying assembly. Problems are encountered in the use of such forage harvesters in that the crop material wedges between the teeth or is wrapped around the rollers, thereby necessitating stoppage of the foraging harvesting until the conveying assemblies are freed. It is understandable that means which eliminate or even reduce the incidence of such feed assembly fouling would be highly desirable.

Even when the feed assembly is not fouled to the point of stoppage, crop material often collects between the teeth and it is not removed therefrom in the conveying operation. This results in a serious loss in the efficiency of the conveying operation which is restored only be freeing the buildup of crop material between the teeth of the rolls.

It is accordingly one important object of the present invention to provide an improved conveying assembly for a forage harvester so that crop vegetation may be more efficiently picked up and moved to a chopper of the harvester.

Another important object of the present invention is a conveying assembly for a forage harvester in which the incidence of clogging of the feed assembly by the crop material is markedly reduced by the improved provision of slat bearing teeth along the peripheral surfaces of rollers in said feed assembly.

Still another important object of the invention is a pivotable upper feed assembly for a forage harvester in which two rotatable rollers are provided with mutually cooperating rows of teeth to markedly reduce or eliminate the incidence of crop material clogging or building up between the rollers of said upper feed assembly.

Still another important object is an upper feed assembly having rollers which pickup and move crop vegetation in an improved way by providing interdigitating rows of teeth on each roller, and wherein the teeth of successive rows on one roller are staggered relative to the teeth in the rows of the other roller, thereby preventing crop buildup between the teeth and between the rollers.

Still another important object of the invention is to provide a pivotal upper feed assembly for a forage harvester, which assembly has forward and rearward rollers with a plurality of teeth bearing slats secured to their peripheral surfaces, and which slats on said forward roller are favorably disposed on said roller relative to the position of the slats of the rearward roller to enhance the combing effect of interdigitation of teeth of the two rollers as the slats pass one another. It has been found that this object is attained by sloping the slats on the forward roller back from the direction of rotation of said roller, whereupon a better stripping action of the crop material from between the rollers is attained.

Another recurring problem of such feed assemblies is the occasional passage of drive means mechanism to the chopper of the harvester following breakdown. Such drive mechanisms include an endless sprocket chain for driving the forward roller of the upper feed assembly, and when such chains break they can pass into the chopper assembly with the great likelihood of serious damage to the chopper. In addition to the serious equipment damage, serious time loss and labor expenditures are encountered. This requires dismantling the chopper to extricate the drive mechanism which has become entangled in the chopper, including broken parts dispersed throughout such chopper.

It is accordingly another important object of the invention to provide an upper feed assembly for a forage harvester in which a drive mechanism for the forward roller of the assembly is prevented by improved means from passing into the chopper upon breakdown.

it It is another important object of the present invention to provide an upper feed assembly having forward and rearward upper feed rollers for a forage harvester in which a drive mechanism for the forward roller interconnects the shafts of both the forward and rearward upper rollers, and where such drive mechanism is retained and captured within a housing in the event of breakdown to prevent damaging passage of the drive means into the chopper.

The foregoing and other objects, features and advantages will become more apparent upon consideration of the following description and appended claims, when considered in conjunction with the accompanying drawings wherein the same reference character or numeral refers to like or corresponding parts throughout the several views.

BRIEF DESCRIPTION OF THE DRAWING

FIG. 2 is a side elevational view, on a reduced scale, partly in section with parts removed, of the feed assembly and other parts of the foraging harvester;

FIG. 3 is a perspective view of an upper feed assembly removed from the forage harvester;

FIG. 4 is a view along section line 4–4 of FIG. 2 on an enlarged scale;

DESCRIPTION OF THE PREFERRED EMBODIMENT

Figure 1:
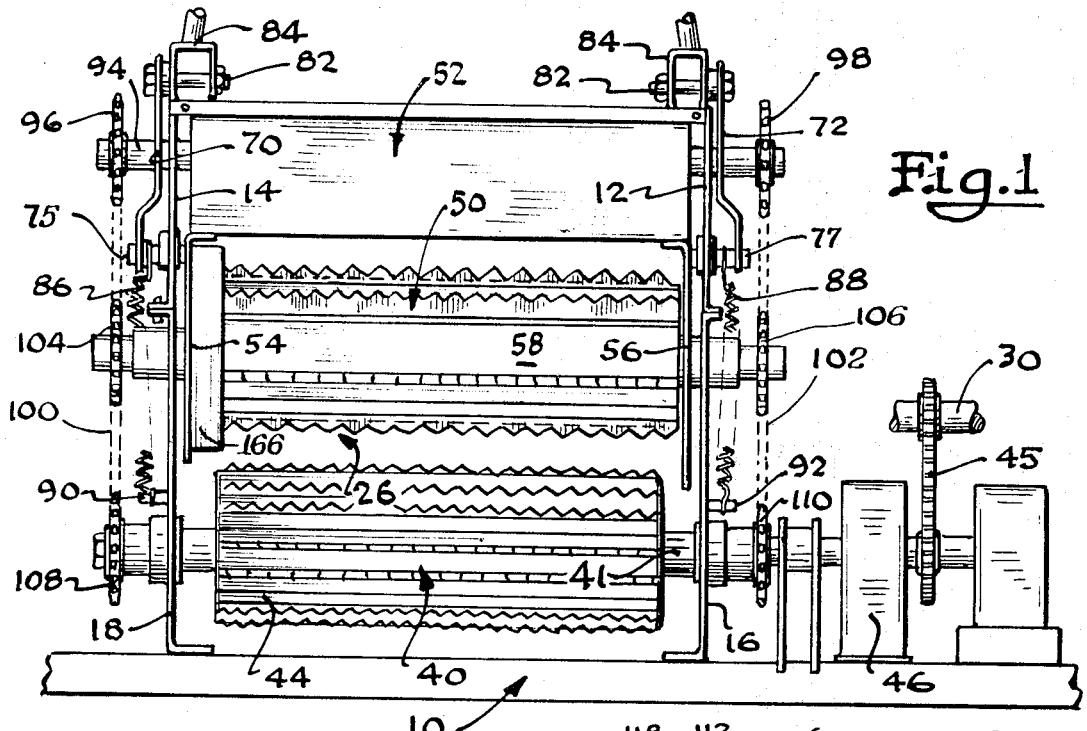
FIG. 1 is an elevational view of a forage harvester, with parts removed, looking toward the front of a forage feeding assembly embodying the present invention.

Referring to FIGS. 1 and 2 of the drawings, a forage harvester is indicated generally at 10, and it includes spaced upper side plates 12 and 14 which are secured to lower side plates 16 and 18 by bolts such as 19 fastening abutting flanges 20 and 21. The forage harvester includes ground contacting traction wheels, one of which is shown at 22 journaled on an axle 24.

The forward part of the side frames have disposed therebetween a feed assembly shown generally at 26. Positioned alongside and behind the feed assembly is a chopper assembly shown generally as 28. The chopper includes a body rotated by chopper shaft (not shown) which is secured or keyed to a central plate 32. A plurality of brackets such as 33 are secured to the plate and each bracket holds a cutting knife such as 34 seated in a groove 35. The knives 34 pass, in shearing relationship, a stationary knife 37 fixed to a block or anvil 38. The crop material is moved by the feed assembly into an opening formed by an interruption in arcuate wall 39 of the chopper assembly.

The feed assembly includes a lower feed or pickup assembly having a forward roller 40 affixed to rotatable shaft 41 and a smaller rearward roller 42 affixed to rotatable shaft 43. Shafts 41 and 43 are journaled at their opposite ends to the side plates 16 and 18 of the frame structure. Roller 42 is shown as having a smooth peripheral surface and roller 40 as having a plurality of longitudinal slats such as 44 extending radially from the surface of the roller. Shaft 41 is shown driven by an endless chain 45 which, in turn, is driven by power shaft 30. A gear reduction box 46 is provided to desirably determine the rotational speed of shaft 41.

The upper feed assembly is shown generally at 50 (FIG. 3). The upper feed assembly is disposed in a housing 52 having opposite sidewalls 54 and 56 which rotatably support a forward roller 58 and a rearward roller 60. Forward roller 58 is rotatable about shaft 62 journaled to the opposite sidewalls 54, 56 of the housing, and rearward roller 60 is rotatable about shaft 64 journaled to the same said opposite sidewalls of the housing.

The upper feed assembly is of the type which pivots so that the forward end of the upper feed assembly follows an arcuate path in its upward and downward travels, such movement indicated by the double headed arrow in FIG. 2. Such movable upper feed assemblies are disclosed in issued U.S. Pat. Nos. 3,195,595 and 3,282,404. The upper feed assembly is connected by a toggle type link which is not shown in detail herein but which permits large bulk crop material to raise the forward part of the housing containing the forward roller whereupon the shaft 62 of said forward roller 58 and pivot points 68 and 69 in the spaced sidewalls 16, 18 move above the shaft 64 of the rearward roller 60. The pivot points 68, 69 include pins 71 and 71a which are journaled in bearing passageways 73 and 73a in linkage arms 76 and 78, as shown in FIG. 3.

The upper feed assembly 50 is limited in its upward travel by a pair of arms 70 and 72, each of which has an elongated slot such as 74. One of the ends of said arms are joined to stub shafts 75 and 77 which extend laterally through side extensions 79 and 80 of the housing 52. Both arms are substantially identical, and are angularly disposed upwardly and rearwardly. Studs such as 82 are fixed to brackets such as 84 which are rigidly mounted to the upper side plates 12 and 14. The upper feed mechanism 50 may be, therefore, rockably adjusted with the movement guided by the stud 82 in the slot 74.

The upper feed assembly is urged to a position toward the lower feed assembly, that is, biasing means impart a rotational force clockwise as best seen in FIG. 2. A pair of tension springs 86 and 88 are provided as the biasing means to urge the upper feed assembly toward the lower feed assembly. The springs extend substantially vertically, and have upper hook ends anchored to the opposite ends of stub shaft 75 and 77, and such springs have lower hook ends anchored to pins 90 and 92 laterally extending from the plates 16 and 18.

A shaft 94 is journaled between the upper side plates 12 and 14, and sprockets 96 and 98 are secured to the opposite ends of said shaft. Endless sprocket chains indicated at 100 and 102 mesh with sprockets 104 and 106 secured to the opposite ends of shaft 64, and with sprockets 108 and 110 secured to the opposite ends of shaft 41 of roller 40 in the lower feed assembly. Sprockets 104, 106 are movable with the upper feed assembly as it rotates in an up and down direction, and the endless chains 100, 102 are flexible to accommodate such movement while maintaining the meshing engagement of the sprockets with the endless chains. These chains 100, 102 wrap about sprockets 108, 110 respectively to drive the rollers 42 and 60.

Figures 5, 7:
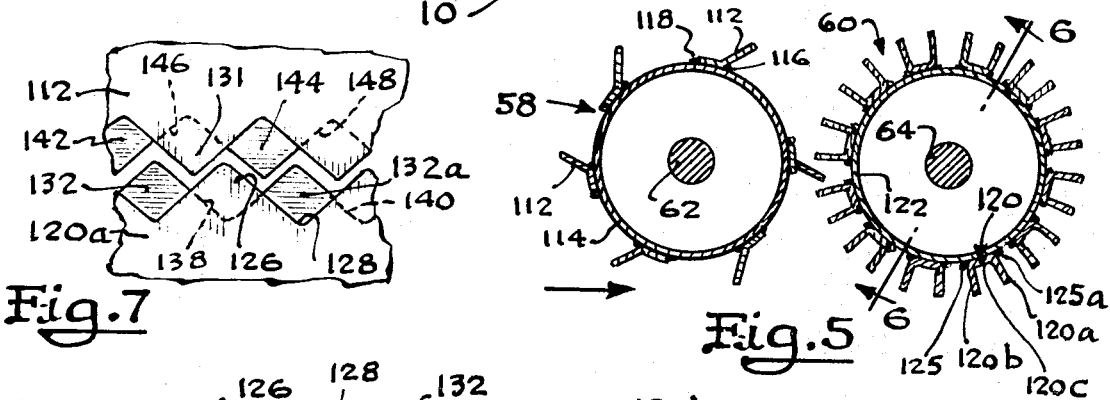
FIG. 5 is a diagrammatic sectional view of the forward and rearward rollers of the upper feed assembly, said sectional view taken along a plane perpendicular to the axes of said rollers.
FIG. 7 is a portional plan view of alined and coplanar slats of the two rollers in edge to edge relationship.

The crop materials enters between the lower feed assembly and upper feed assembly as indicated by the arrow. Rollers 58 and 60 of the upper feed assembly rotate clockwise relative to the depiction of FIG. 2, and the crop material is thereby fed into the adjoining chopper. A plurality of elongated slats such as 112 are circumferentially spaced on the roller 58, and are secured to the peripheral surface 114 of that forward roller by means such as welds 116, 118 (FIG. 5). All the slats such as 112 extend to the same radial distance from the peripheral surface, and these elongated slats lie in a plane which does not pass through the center axis of the roller. Such slats are sloped or slanted back from the direction of rotation to provide better stripping action of the crop material from the slats of the rearward roller. The rearward roller 60 also has a plurality of slat members 120 projecting outwardly from the peripheral surface 122. Each slat member is shown as, an integral U-shaped elongated body (but does not necessarily have to be so) having spaced upright walls 120a and 120b, which walls comprise the operating slats. A bottom wall 120c joins the bottom edges of the upright walls, and said bottom wall is secured to the peripheral surface by means such as welds 125 and 125a. It will be seen that the rearward roller 60 has a plurality of slats substantially in excess of the number of slats on the forward roller and is operative to provide a stripping action of crop material from the forward roller 58.

A plurality of axially spaced teeth are displaced along the top edges of the slats on both rollers 58, 60. The teeth on each slat of each roller are preferably of the same configuration, size and number. According to the sectional view of FIG. 6, which for purposes of illustration may be viewed as taken between the sidewalls of adjoining unitary slat members 120, it is seen that the teeth have a triangular configuration, and that a pair of adjoining teeth such as 126 are separated by a space 128 which is of similar but inverted configuration relative to the tooth.

Figure 6:
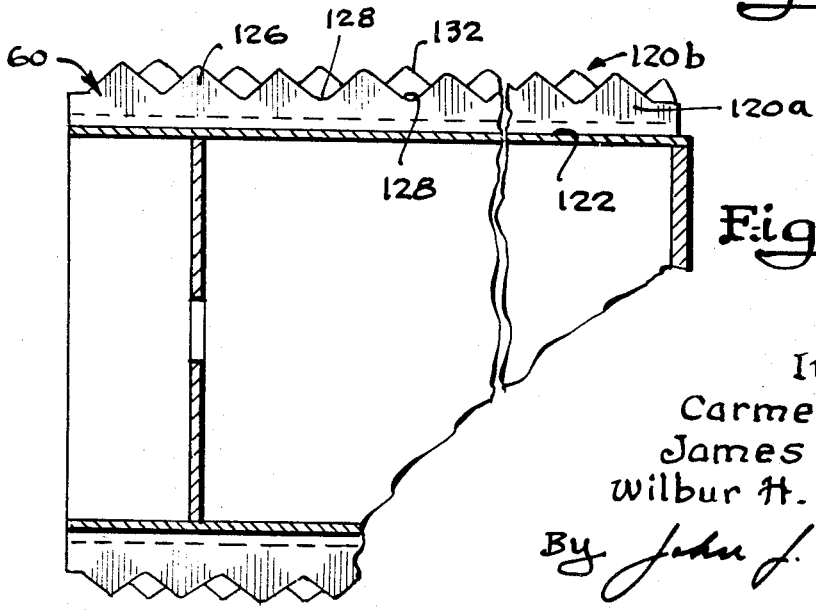
FIG. 6 is a sectional view on an enlarged scale, taken along line 6–6 of FIG. 5.

The teeth on a slat of the forward roller will interdigitate with the teeth on an alined slat of the rearward roller to provide improved combing action. The teeth on one slat, in other words, will move into the spaces between the teeth of an alined slat on the other rolls. The spaces on the alined slat may also be considered as being laterally offset portions relative to the teeth on the other roller which move therethrough. This relationship is shown in FIGS. 4, 6 and 7. It is seen that a tooth 126 in slat 120a of the rearward roller interdigitates with a tooth 131 in slat 112 of the forward roller. It will also be seen that a tooth such as 131 of slat 112 will be accommodated in laterally offset space such as 128 of the slat 120a. This interdigitating relationship occurs when the adjoining teeth edges of the respective slats are alined in substantially coplanar relationship. The interdigitation actually occurs in the course of arcuate sweeping or combing action of one slat relative to the other, as indicated in stop action in the view of FIG. 5. In actual operation, the rearward roller is driven at higher rotational speeds than the forward roller so that the stripping action is enhanced with a greater number of slats on said rearward roller.

Crop material may collect between the interdigitating teeth and, particularly, orient itself in the laterally offset spaces 128 between teeth 126. The collection of the crop material in the spaces between are substantially eliminated by staggering the teeth in immediately adjoining slats on each roller. The teeth on successive slats of each roller are also staggered relative to the teeth on the slats of the other roller so that the teeth on one roller works through the laterally offset portions of a space between two corresponding teeth on the other roller. This is illustrated in the view of FIG. 6 where the slat 120a is shown positioned in front of immediately adjoining slat 130 having a plurality of triangular shaped teeth such as 132. The teeth such as 132 are disposed along the top edge of slat 130 so that each tooth is alined with a space 128 of slat 120a. Another way of stating this positional relationship, is to say that a tooth of one slat is alined with a space between teeth of an immediately adjoining slat along a radius of the roller. This relationship is further shown in the portional view of FIG. 7 where slat member 120a is adjoined by upright wall 120b having spaced teeth such as 132 and 132a and alternating spaces such as 138 and 140 indicated in dotted line. The upper slat 112 is further shown as having an immediately adjoining rearward slat with teeth 142 and 144 which have alternating spaces 146 and 148 indicated in dotted line. The overall effect is of a saw tooth configuration.

It will be further seen from the view of FIG. 7 that a plurality of staggered teeth on the slats of both rollers present a pattern which effectively sweeps virtually all the space or gaps between the edge to edge disposition of any slats of the respective rollers. The respective radial alinements of a space on one slat and a tooth on an immediately adjoining slat on the same roller results in an immediately pair of adjoining slats on each roller providing teeth dispositions which sweep the spaces formed in the edge to edge alinement of the slats. When a single slat from the forward roller forms a coplanar alinement with a single slat on the rearward roller 60, the laterally offset spaces are shown as having a generally rectangular shape. This rectangular space is effectively filled by the rectangular configuration attained by alined staggered teeth such as 136 and 144 on the immediately adjacent slats of the respective rollers. It is seen that such space accommodates at least two axially spaced teeth on the other roller.

The upper feed assembly is provided with an enclosed drive train which drives the forward roller 58 from the rearward roller 60 as illustrated in FIG. 4. The shaft 64 of the rearward roller 60 has the sprockets 104, 106 secured to the opposite ends, which sprockets are in meshing engagement with the endless sprocket chains 100 and 102. The opposite ends of such shaft also pass through sleeves 150 and 152 which are secured to the side sheets 54 and 56. the shaft 64 turns with sprockets 104, 106 and drives a sprocket 154 through a hub 160 attached to roller 60. An endless chain indicated in dotted line and designated as 157 is turned by sprocket 154 to drive a sprocket 156 which is keyed in driving relation to forward roller 58 through hub 158. The rearward sprocket 154 is secured in driving relation to the rearward roller 60 through the hub 160. The drive means for the upper forward roller 58 of the upper feed assembly, namely, the sprockets 154, 156 and the chain 157, are disposed within a housing generally designated 162 which is formed by the sidewall 54 having secured thereto an inner facing casing 166 which encases the upper feed assembly drive means as shown in FIG. 4.

It will be seen that in event of a breakdown of the drive mechanism within the housing 162, that chain 157 will be caged or captured within that housing, and therefore be prevented from passing into the chopper of the forager.

The spacing arms 76 and 78 are pivotally mounted upon the sleeves 150 and 152 respectively which are mounted about shaft 64 and secured to sidewalls 164, 56. The spacing arms 76, 78 have bearing hubs 170 and 172 which have bearing passageways 174 and 176 disposed about the sleeves 150, 152 respectively. The arms 76 and 78 form linkages which have two pivot points, namely one along sleeves 150 and 152, and the other along pins 71 and 71a. When the upper feed assembly is raised by the crop material, pivot points at sleeves 150 and 152 will be raised relative to the pivot points 68 and 69. After the crop material passes through the feed assembly into the chopper, springs 86, 88 (FIG. 1) will pull the upper feed assembly towards the lower feed assembly so that pivot points at the sleeves 150 and 152 and the pins 68 and 70 are substantially alined with the shaft 62 of the forward roller. This action will tend to compress the smaller bulk crop material passing through the feed assembly.

The invention may now be practiced in the various ways which will occur to practitioners, and it is intended that all such practice comprise a part of the invention so long as it falls within the scope of the terms in the appended claims as given further meaning by the language of the preceeding specification.

We claim:

1. A feed assembly for a forage harvester comprising opposing conveyor components adapted to receive crops therebetween, at least one of said components comprising a pair of substantially parallel rollers coactively disposed in delivery relation to each other, a plurality of axially and circumferentially spaced teeth projecting outwardly from the periphery of each said roller, means for driving said rollers at differential peripheral speeds, and one of said rollers being a first roller having its teeth disposed in axial spaced relation to successive teeth on the other roller passing therebetween, and circumferentially successive teeth on the other roller spaced to sweep at different axially offset locations in the spaces between respective pairs of teeth of the first roller.

2. The invention according to claim 1 wherein the first roller having axially adjacent spaced pairs of teeth defining said space therebetween, and the other roller having said successive teeth displaced axially and circumferentially from each other wherein at least two succeeding teeth of said other roller interdigitate in the spaces between the pairs of teeth of the first roller.

3. A feed assembly for a forage harvester comprising a rotatable lower feed assembly and an upper feed assembly which includes:
   a rotatable front roller;
   a rotatable rear roller;
   means driving said rollers at differential peripheral speeds;
   a plurality of elongated peripheral slats axially disposed on each roller and said slats having sets of teeth;
   said rollers positioned relative to each other so that sets of teeth on respective slats interdigitate when said slats become alined; and
   the teeth on consecutive slats of the rear roller being offset longitudinally of the roller relative to the teeth on the slats of the front roller, whereby successive teeth on the rear roller pass through different areas of the space between corresponding teeth on the slats of the front roller.

4. A feed assembly for a forage harvester as in claim 3 wherein the slats of the front roller are sloped back from the direction of travel, and the slats of the rear roller extend radially outward of the rearward roller.

5. A feed assembly for a forage harvester as in claim 4 wherein:
   the rear roller has a plurality of slats secured to the peripheral surface of said roller at substantially equally distant circumferential spacings;
   said front roller has a plurality of slats secured to the peripheral surface of said forward roller at substantially equally distant circumferential spacings; and
   the number of slats on said rear roller is greater than the number of slats on said front roller.

6. A feed assembly for a forage harvester as in claim 5 wherein said rear roller is rotated at peripheral speeds greater than the peripheral speed of said front roller to provide a coacting cleaning relationship therebetween and thereby prevent crop buildup between said rollers.

7. A feed assembly for a forage harvester as in claim 5 wherein the number of slats on said rear roller are about twice the number of slats on said front roller.

8. A feed assembly for a forage harvester as in claim 5 wherein:
   the slats on both rollers have teeth of similar configuration, size and number;
   each of the slats on the same roller extend the same radial distance from the peripheral surface of their roller; and
   the tooth bearing edge of each slat on each roller comprising a saw tooth configuration.

9. A feed assembly for a forage harvester as in claim 3 wherein:
   the front and rear rollers each have their respective supporting shafts to rotate thereon;
   drive means secured to one of the ends of the front and rear roller shafts; and
   a drive means housing substantially enclosing said drive means to prevent passage of said drive means into the conveying assembly in event of drive means breakdown.

10. A feed assembly for a forage harvester as in claim 9 wherein said drive means include:
    a sprocket secured on one end of said front roller shaft;
    a sprocket secured on one end of said rear roller shaft, said sprockets being substantially alined on said shaft ends.